June 29, 1965 E. F. POLKA 3,191,225
APPARATUS FOR CONTROL OF MATERIAL DISTRIBUTION
IN BLOW MOLDED PLASTIC ARTICLES
Filed Oct. 30, 1962 4 Sheets-Sheet 4
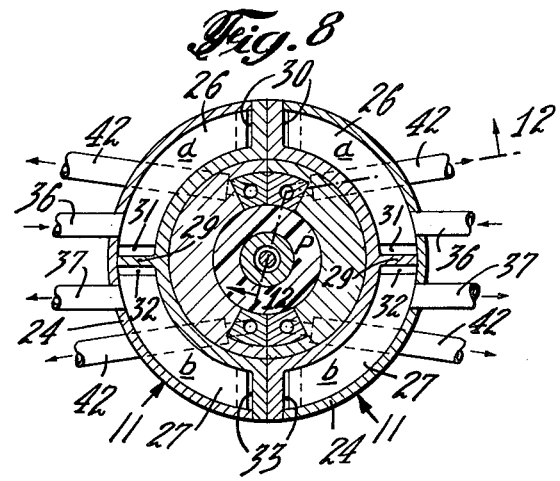
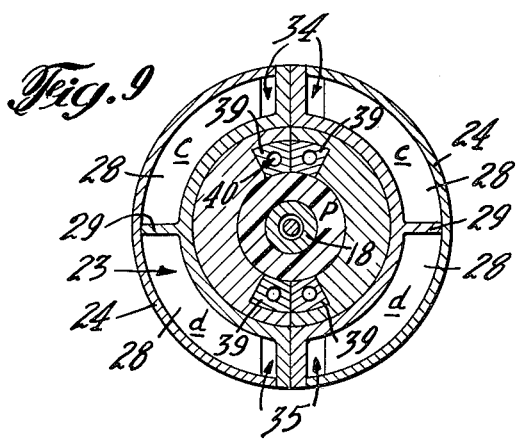
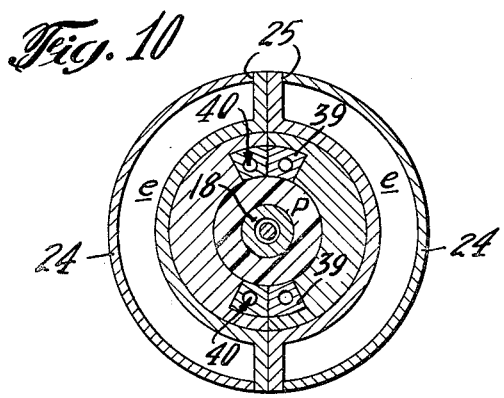
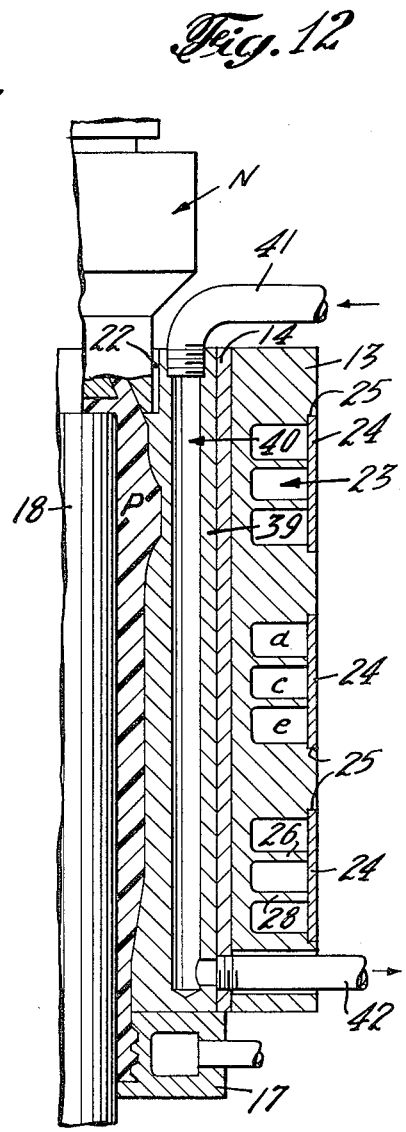
INVENTOR.
EUGEN FRANZ POLKA
BY Louis F. Heeb
George W. Reiber
ATTORNEYS

United States Patent Office 3,191,225
Patented June 29, 1965

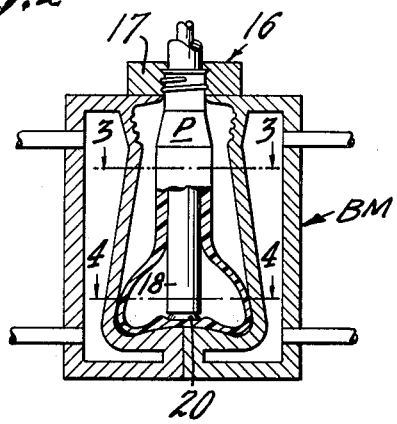
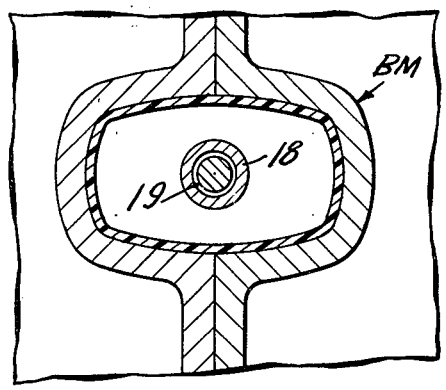
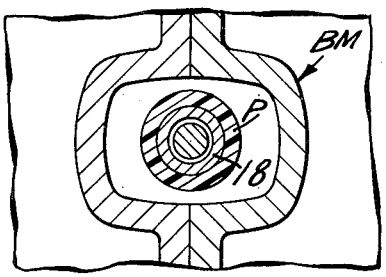
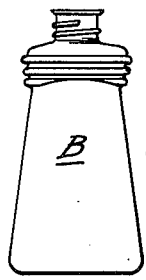
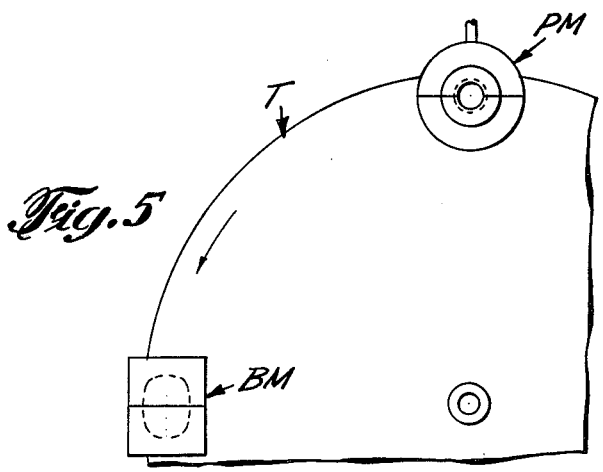

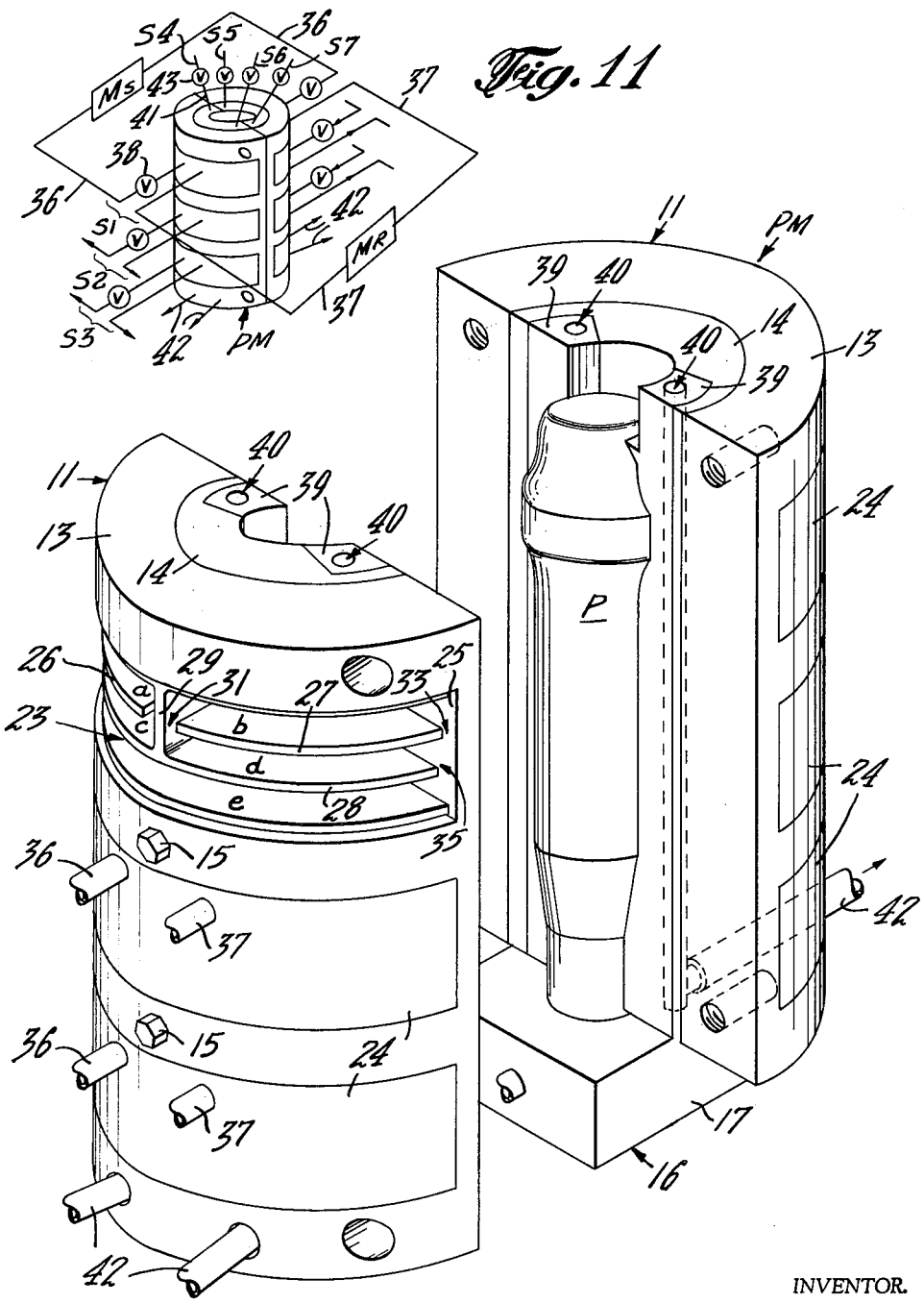

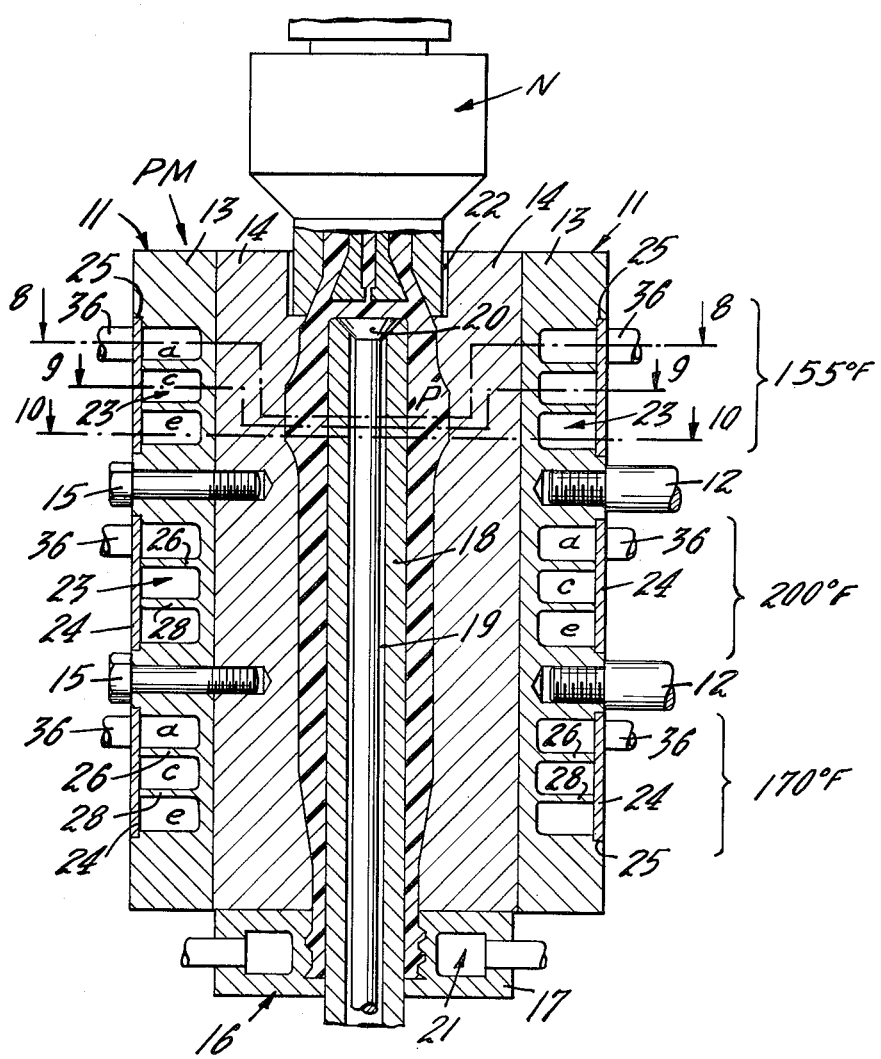

3,191,225
APPARATUS FOR CONTROL OF MATERIAL DISTRIBUTION IN BLOW MOLDED PLASTIC ARTICLES
Eugen Franz Polka, Algonquin, Ill., assignor to American Can Company, New York, N.Y., a corporation of New Jersey
Filed Oct. 30, 1962, Ser. No. 234,136
4 Claims. (Cl. 18—5)

This invention relates to the manufacture of hollow, thin-walled plastic articles and, more particularly, to a technique for controlling the material distribution in the walls of blown plastic bottles and the like.

Blown plastic bottles are becoming a fairly popular container for products such as liquid detergents, cosmetics, cleaning fluids, liquid comestibles, and a host of other household products. With the housewife as the principal consumer, the trend is toward bottles designed in a wide range of sizes and fanciful shapes having the greatest possible eye appeal. Although aesthetically attractive, these irregularly shaped bottles represent a real challenge to the container manufacturer in that they are measurably more difficult to mold than the simplifier, generally cylindrical bottle configuration used in the past.

The principal problem lies in controlling the material distribution in the blowing mold to insure uniform wall thickness and avoid weakened areas in the finished bottles. Unlike a simple cylindrical bottle where uniform distention of the plastic during the blowing cycle is fairly easily controlled, present bottle designs may have variable cross-sections, both transverse and longitudinal, abrupt corners and shoulders, and various corrugated and/or embossment patterns formed therein for both appearance and structural purposes, all of which contribute to the severity of the problem of maintaining uniform plastic distribution in the bottle walls. Too, packers are turning to blown plastic of larger size and volume for certain products, compounding even more the problem of wall thickness control as it relates to strength and shape retention characteristics. Bottles blown by previously known methods frequently have been found to experience wall thickness variations as high as the ratio of 4 to 1 in areas where uniformity is desired, indicating poor control which results in local weak spots and a commercially unacceptable product.

Blown plastic containers are customarily manufactured in a two-step process by first shaping a preform, ordinarily referred to as the parison, and then inflating the parison by fluid pressure to finished bottle shape in a blowing mold. This process may be accomplished by either of two techniques which have become known in the trade as extrusion-blow and injection-blow, or some combination of the two.

The injection-blow method, wherein the parison is first formed under hydrostatic pressure in an injection mold and thereafter transferred to the blowing mold, usually while retained on a separable core pin on which it was formed, has several advantages to recommend it over the extrusion-blowing, particularly in the manufacture of the divers bottle configuration now in increasing demand. Among these are greater equipment flexibility, reduction of imperfections normally attributable to such extrusion-blow characteristics as neck-down, irregular temperature and viscosity, and the pinch or weld line required to close the end of an extruded parison, and, to a large extent, the ability to positively control the cross-sectional configuration of an injection molded parison as a means to achieve improved orientation and distribution of the plastic material in the walls of the finished bottle.

It is well recognized by those skilled in the bottle blowing trade that the parison material, customarily an organic resin such as polyethylene, must have sufficient strength and tenacity to accommodate itself to indeterminable shifting strains when distended without rupturing and yet be maintained sufficiently hot and pliable to expand to the desired shape without excessive stressing. When there is added to this the requirement of proper distribution of material so that the walls of the blown bottle are uniform where intended and of sufficient thickness in those areas where strength is needed, it is seen that the problems of manufacturing commercially acceptable blown plastic bottles are of no small proportion.

The injection-blow process affords solutions to many of these problems but is still susceptible to improvement, particularly in meeting the challenge presented by the demands for blown bottles of increasingly radical geometry at lower unit costs. A recent development in this area, and one which has resulted in a measure of success in overcoming the uniform material distribution problem, is that of parison contouring. That is, the parison is injection molded in a contoured mold to provide the parison at specific locations, in either or both its transverse and longitudinal planes, with that volume of plastics required for the desired distribution in the corresponding wall section of the resulting blown bottle. This procedure, although measurably successful, is not entirely satisfactory for several reasons. For one thing, contoured parisons, having varying and eccentric cross-sectional dimensions, are less easily molded free of striation effect and deleterious strain patterns than are parisons of simpler geometry. Secondly, a contoured parison of obround or non-circular cross-section imposes the mechanical problem of proper registration in the blowing mold. Thirdly, it has been found that there is a real limit to parison contouring beyond which adequate control of material distribution can not be achieved. Finally, there are those problems attributable primarily to the nature of the injection-blow procedure itself, being subject to such variables as plastic temperature and viscosity, heat transfer effects, fluctuation in blowing pressure, and a host of others which do not lend themselves to control simply by the parison contouring technique. Specifically, there is the problem of controlling the temperature of the injected parison, as it is removed from the parison mold and transferred to the blowing mold in its hot and pliable state, so that it will not "crawl" or shrink on the corepin to an extent to cause it to rupture or deform. Additionally, there is the problem of heat transfer effect between the surface of the blowing cavity and the parison wall as it is progressively distended tending to cause those sections of the parison which first contact the blow mold walls to chill or set in advance of the other plastic. The contoured parison, having eccentric wall sections which expand at non-uniform rates, is particularly susceptible to this latter condition.

All these factors contribute to the difficulty of controlling the many variables present in the injection-blow process and point to a definite need for an improved technique for controlling wall quality in blown plastic bottles, particularly to meet the challenge presented by the increasing demand for bottles of extremely varied shapes and larger sizes.

It is therefore a principal object of the present invention to improve on the prior art in effecting controlled orientation and distribution of material in the walls of injection-blown plastic bottles.

Another object of this invention is to provide a means for regulating and controlling the distribution of plastic in the various wall sections of a blown container, irrespective of its final shape.

A further object of this invention is the provision of a means whereby the expansion of a plastic parison in the blowing mold, in all of its various portions, may be fully controlled to regulate the flow of plastic into contact with predetermined areas of the mold cavity and at predetermined thicknesses.

Still another object of this invention is the provision of a means for preparing an injection molded parison of generally circular cross-sectional configuration, during its formation, to effect a desired disposition of the plastic in the walls of the bottle to be formed therefrom.

Yet another object of this invention is the provision of simplified and practical means for forming blown plastic bottles in a wide range of shapes and sizes with improved control of the distribution and orientation of plastic in the bottle walls.

Numerous other objects and advantages of the invention will be apparent as it is better understood from the following description, which, taken in connection with the accompanying drawings, discloses a preferred embodiment thereof.

To the accomplishment of these objects, the present invention contemplates a three-dimensional temperature gradient embodied in the parison mold for controlling, independently and in any desired pattern, the relative temperatures of appropriate portions of the parison wall in proportion to the desired ultimate shape each portion will assume when fully distended to the finally shaped bottle. The injection mold is constructed with a plurality of appropriately positioned passages disposed about the parison cavity and through which are circulated heat transfer media at predetermined temperatures and flow rates as calculated to achieve the desired temperature gradients in the parison wall.

Referring to the drawings:

FIG. 1 is a front elevation view of a typical plastic bottle configuration made in the manner of the present invention.

FIGS. 2-5 illustrate generally certain of the steps in the operation of forming the bottle of FIG. 1, showing the rudiments of the apparatus therefor.

FIG. 6 is a perspective view of the parison mold mechanism used to practice the present invention, with parts shown in their retracted or open relationship.

FIG. 7 is a sectional view of the same mechanism shown in FIG. 6, with the parts shown in closed mold relationship.

FIGS. 8, 9 and 10 are sectional views taken substantially along lines 8—8, lines 9—9, and lines 10—10, respectively, of FIG. 7.

FIG. 11 is a perspective view of the parison mold mechanism showing schematically the flow control system therefor.

FIG. 12 is a fragmentary sectional view taken substantially along lines 12—12 of FIG. 8.

The general type of bottle configuration to which the present invention is specifically directed is shown in FIG. 1, there being illustrated a bottle B having an attractive yet extremely complex geometry from the standpoint of the practical problems confronting automatic production. Such a bottle is formed in a blowing mold of the conventional type illustrated generally as BM in FIG. 2. The conventional injection-blow cycle for forming bottle B calls for injection molding a parison P at an injection station generally designated PM, and then transferring the parison immediately to the blowing mold to inflate it by fluid pressure to finished bottle shape. A turret generally designated T or other type of intermittent motion machine, as illustrated very simply in FIG. 5, may be used for such an operation.

As a preferred or exemplary form of the invention, FIG. 6 illustrates the injection mold PM as comprising a pair of mold sections generally designated 11, 11 which are relatively movable into and out of closing engagement by means of suitable actuating mechanism (not shown) connected to actuating rods 12 fixed to one of the mold sections (see FIG. 7). Each mold section 11 has a semicylindrical outer shell 13 and a semicylindrical mold segment 14 snugly conforming to the interior surface of the shell and fixed thereto by screws 15 or other suitable means of securement. The interior surfaces of the pair of mold segments 14, 14 form the confining walls of the mold cavity in which the parison P is formed, and are contoured to shape the parison to a predetermined desired configuration.

In the form illustrated, parison P is shown as being substantially circular in transverse cross-section but contoured axially or longitudinally to provide its side wall of varying weight from end to end. This configuration represents a practical compromise to the problem of plastic distribution in the bottle walls in that wall thickness and uniformity is controlled by axial contouring in conjunction with the tempering technique of the present invention as will be described in the succeeding paragraphs, rather than relying solely on both transverse and longitudinal contouring with its attendant problems hereinabove explained. The arrangement thus illustrated represents one that may be selected as the optimum parison shape for the most extreme or radical configurations of bottle B, it being understood that a simple cylindrical parison geometry is preferred and will be adequate for most bottle shapes when prepared in the manner of this invention.

A core pin-thread plate assembly generally designated 16 is brought into engagement with one end of the closed mold sections 11, 11 to form the interior support and neck end surfaces of the mold PM. This assembly comprises a thread plate 17 which closes one end of the mold and provides that portion of the parison cavity for forming the threaded neck end of the bottle B, and a core pin 18 which extends into the injection mold in cantilever fashion to a point just short of the opposite end, thereby forming the interior wall surfaces of the cavity. The core pin-thread plate assembly 16 is operable as a unit and is adapted to be transferred to the blowing mold BM with the parison P retained thereon. As best shown in FIG. 7, the core pin 18 may be provided with a central passage 19 and a valve 20 at its tip end for the flow and regulation of a fluid under pressure, in which case the core pin also functions as a blow pin in the blowing mold. The thread plate 17 is ordinarily provided with a passage 21 through which a cooling medium may be circulated to set the neck portion of the bottle B in advance of its blowing in mold BM. The opposite end of the mold is recessed as at 22 to accommodate an injection nozzle N (see FIG. 7) which injects a molten plastic, such as polyethylene, into the mold under hydrostatic pressures to form the parison P.

Each of the outer shells 13 have formed therein a plurality of vertically disposed circulating passages generally designated 23, each passage in one shell being paired up with a diametrically opposed passage in the other shell to provide a number of cooperatively paired tempering passages at spaced increments vertically of the mold PM. These passages are hollowed into each shell from its outer surface and extend inwardly to a depth just short of the inner cylindrical surface of the shell which conforms to mold segment 14. These passages 23 are enclosed by cover plates 24 which fit tightly against a ledge surface 25 surrounding each passage and are permanently secured thereto by soldering or other type of fluid tight securement. As best shown in FIGS. 6-10, each circulating passage 23 is divided by fins 26, 27 and 28 and an intermediate wall 29 into several annular channels, designated $a$, $b$, $c$, $d$ and $e$, which are serially interconnected to define a tortuous path throughout each passage. Fins 26 and 27 terminate short of intermediate wall 29 and the end walls forming the opposite ends of passage 23 to provide narrow spaces 30, 31, 32 and 33 leading from channels $a$ and $b$ into $c$ and $d$, respectively (see FIG. 8). Fin 28 is integral at its center with intermediate wall 29, but also terminates short of the confining end wall of passage 23 to provide spaces 34 and 35 leading into the extreme ends of channel e, this latter channel extending the whole arcuate length of passage 23 (see FIGS. 9–10).

Each circulating passage is provided with a pair of conduits 36, 37 tapped into cover plates 24, these conduits providing, respectively, the inlet and outlet for a heat transfer medium to be circulated therethrough. Inlet conduit 36 communicates with channel a of passage 23, whereas return conduit 37 connects with channel b. The heat transfer medium is therefore circulated through channel a, down through spaces 30 and 31, through channel c and space 34 into channel e, across channel e and up through space 35 into channel d, through channel d and up through spaces 32 and 33 to arrive finally in channel b, from where it leaves by return conduit 37. This channel configuration and the tortuous circulating pattern achieved thereby is substantially identical for each passage 23 for both outer shells 13, 13.

The disposition of passages 23 in outer mold shells 13, 13, as hereinabove described, has as its object the imposition upon the parison P of a predetermined vertical temperature gradient. That is, the temperature of the plastic in select vertical regions of the parison is to be controlled, in accordance with a predetermined correlation between material temperature and its viscosity or ability to flow, in order to effect the desired orientation and distribution of the plastic material in corresponding portions of the walls of the finally blown bottle. The exact temperature gradient to be effected will depend, of course, upon the characteristics of the specific bottle blowing operation, and is a function of such variables as machine cycle time, core pin condition, available tempering time, characteristics of the molten plastic, etc. Accordingly, the number of passages 23 to be provided will vary from job to job, depending on the desired gradient; and, certainly, the nature and flow rate of the selected circulating medium in each passage may be varied as desired to meet specific operating conditions.

By way of example and not limitation, a 3-passage system of the type illustrated in the drawings was designed to impose on the injection mold PM a temperature profile as follows: 170° F. at the thread plate end; 200° F. in its center region; and 155° F. at its nozzle end (see FIG. 7). This profile was found to represent an ideal or optimum mold condition to achieve the desired blowing characteristics for the selected geometry of parison P when molded from molten polyethylene at a stock temperature of 445° F. and subsequently blown in a machine having particular cycle characteristics. As such, the specific profile above indicated is applicable to a given situation where the operating variable and characteristics are known, it being understood that the exact temperatures for each level will vary with different operating conditions and to achieve different results as desired. A temperature profile of lower levels may be desirable in some instances where available conditioning time is short, but care must be exercised in the selection of a profile that does not have the effect of over-treating or chilling the mold surfaces. At the other extreme, the temperature levels of the selected profile must not be too high as to cause the parison P to stick in the mold cavity. For stock temperatures in the neighborhood of 425° F.–450° F. at time of injection, a temperature gradient wherein the maximum local temperature does not substantially exceed 200° F. has been found to effect satisfactory heat extraction in a relatively short conditioning time and without encountering sticking in the mold cavity.

To achieve this particular mold gradient, a suitable heat transfer medium, such as ethylene glycol solution, was circulated through the three passages 23 on each side of the injection mold from three separate and distinct sources of supply, each supply being maintained at that temperature calculated, for a given rate of flow, to produce the desired variations in viscosity in select regions of the parison in a given conditioning time interval which, in this case, was approximately three seconds.

Preferably, outer mold shells 13, 13 are of a low heat conductive material, such as stainless steel, to ensure that the temperature conditioning effected by each individual passage 23 remains substantially local and concentrated so that the overall gradient is distinct and well defined. With such a poor conductive material, however, it is necessary that channels a, b, c, d and e of each passage 23 be as deep as possible to permit maximum heat transfer between the parison through mold segments 14, 14 and outer shells 13, 13 and the circulating media.

The preferred circulating system for an operation of this type is illustrated schematically in FIG. 11. A separate supply manifold $M_S$ and a separate return manifold $M_R$ are provided for each of three passages 23. As shown, the two supply conduits 36, 36 for the two paired passages 23, 23 on opposite sides of the mold communicate with a common supply manifold, and the two corresponding return conduits 37 lead into a common return manifold. A control valve 38 in each of the supply conduits provides means for independently regulating the circulation through each of the passages. An identical arrangement is provided for each of the three vertically spaced, pairs of passages in the mold PM, being designated as three separate and distinct systems $S_1$, $S_2$ and $S_3$. In this manner, a different heat transfer medium maintained at a predetermined temperature may be circulated through each of the three systems to achieve the desired temperature gradient in both halves of the mold. In some instances, however, the article to be formed may call for an asymmetrical distribution of material in its opposed walls, in which case separate operation of the two mold sections is desirable; i.e. separate supply and return manifolds for each half of the mold PM.

Referring now to FIG. 12 and again to FIG. 6, there is shown additional tempering means for controlling the peripheral temperature gradient in the wall of the parison P, as distinguished from the system for vertical tempering as hereinbefore described. The ability to impose a peripheral gradient, by which is meant a temperature profile about the longitudinal or vertical axis of the parison, in addition to the vertical gradient enables three-dimensional control of material distribution in the bottles to be formed from parison P. Obviously, such a three-dimensional system as represented by the present invention provides a highly flexible and versatile technique for blowing bottles of extremely varied and complex geometry, having greatly improved material distribution and wall thickness uniformity.

In the construction illustrated, inner mold segment 14 in each mold section 11 is provided in its inner face with a pair of vertically extending tempering bars, 39, 39, which are bored along their length to provide a pair of passages 40, 40. Each bar 39 is properly contoured to form a portion of the parison mold cavity and is carefully fitted into the segment so as to maintain a substantially continuous mold surface and engagement face with the opposite mold segment. These tempering bars 39 are selectively positioned with respect to the periphery of parison P so that the parison is tempered along predetermined peripheral areas calculated to expand in a desired pattern when inflated in the blowing mold. Bars 39 are preferably made from a high heat conductive material, such as bronze or copper, whereas mold segments 14, 14 are of a lower heat conductive material, such as stainless steel. By a proper selection of materials, the tempering accomplished by each of the four tempering bars 39 will retain a sharp and distinct profile with respect to the non-tempered surfaces of the parison P.

Each passage 40 communicates at the top of the mold with a supply conduit 41 and empties near the bottom end of the mold into a return conduit 42 which extends outwardly through mold segment 14 and outer shell 13 so as to clear the thread plate assembly 16. As in the case of the vertical tempering passages 23, each of the peripherally positioned passages 40 may have its own circulation system, indicated as $S_4$, $S_5$, $S_6$ and $S_7$, with a regulating valve 43 for each (as illustrated in FIG. 11).

Alternately, the inlet conduits may all communicate with a common supply manifold, it being understood that the selected arrangement may vary with the nature of the particular operation to be performed. For those instances where it would be desirable to achieve local peripheral tampering, by which is meant a variable rather than a uniform temperature profile in any or each of the fourth peripheral locations, it will be understood that bars 39 could be segmented and provided with a separate circulation system for each segment to achieve this result.

It is thought that the invention and many of its attendant advantages will be understood from the foregoing description and it will be apparent that various changes may be made in the form, construction, and arrangement of parts of the apparatus mentioned herein, without departing from the spirit and scope of the invention or sacrificing all of its material advantages, the apparatus hereinbefore described being merely a preferred embodiment thereof.

I claim:

1. An injection mold for forming hollow, thermoplastic parisons to be blow molded into plastic containers, comprising outer mold sections interiorly contoured and being relatively moveable into and out of closing engagement to form the outer confining surface of an annular mold cavity, and an elongated core supported co-axially within said mold sections when in closed position to form the inner confining surface of said cavity, said mold sections being provided with a plurality of passages at spaced increments along its longitudinal axis and extending arcuately about said axis a predetermined distance outwardly from said outer confining surface, each passage in one mold section being positioned with respect to a passage in another mold section to form cooperating sets of passages substantially encircling said cavity at each of said spaced increments, said mold sections also being provided with a plurality of passages extending longitudinally thereof at spaced circumferential increments about said axis outwardly from said outer confining surface, inlet and outlet conduits communicating with each of said passages for circulating therethrough heat transfer media at predetermined temperatures, said conduits for each of said passages being independently controllable and separately supplied with a heat transfer medium at a different temperature to thereby impose upon said mold cavity, in aggregate effect, a predetermined, three-dimensional temperature gradient.

2. Apparatus for manufacturing blown plastic containers comprising means for forming a hollow, tubular parison from heat-softened plastic material, a blowing mold for expanding said parison under fluid pressure into finished container shape, a conveyor for transferring said parison from said parison-forming means to said blowing mold, and means associated with said first means for subjecting select portions of said parison to a three-dimensional temperature gradient, said last means comprising heat conductive elements operable to peripherally and longitudinally confine said parison for a predetermined period of time and separate heat conductive sources connected with said elements to maintain select regions of said elements at different and distinct temperature levels to establish a desired temperature gradient therein, said heat sources being maintained at different operating temperatures and being independently controlled to effect differential heat transfer between said select regions of said elements and said select portions of said parison to render certain ones of said portions more viscous than others whereby said plastic material in each of said portions will assume a predetermined distribution when expanded in said blowing mold.

3. The apparatus of claim 2 wherein said heat conductive elements comprise a pair of relatively moveable metal blocks, each of said blocks being interiorly contoured to conform substantially to the exterior of said parison and having formed therein a plurality of passages at spaced locations corresponding in size and position to said select portions of said parison, certain ones of said passages in one block being paired with correspondingly spaced passages in the other block, each of said paired passages being connected with one of said separate heat sources, said heat sources being heat transfer media adapted to be independently circulated through respective ones of said paired passages.

4. The apparatus of claim 2 wherein said paired passages are disposed to substantially encircle said parison at spaced increments along its longitudinal axis to provide an axial temperature gradient, and others of said passages extend lengthwise of said blocks at spaced circumferential positions relative to the parison to provide a peripheral temperature gradient.

References Cited by the Examiner

UNITED STATES PATENTS

| | | | |
|---|---|---|---|
| 2,331,702 | 10/43 | Kopitke | 18—5 |
| 2,336,821 | 12/43 | Wadman | 65—80 XR |
| 2,336,822 | 12/43 | Wadman | 65—80 XR |
| 2,872,700 | 2/59 | Knowles | 18—5 |
| 3,069,722 | 12/62 | Kato | 18—5 |
| 3,080,614 | 3/63 | Adams | 18—55 |
| 3,081,489 | 3/63 | Jackson et al. | 18—5 |
| 3,082,484 | 3/63 | Sherman | 18—55 |
| 3,125,619 | 3/64 | Miller | 264—98 |

MICHAEL V. BRINDISI, *Primary Examiner.*

MORRIS LIEBMAN, ROBERT F. WHITE, *Examiners.*